(12) United States Patent  (10) Patent No.: US 7,581,836 B2
Uchiyama et al.  (45) Date of Patent: Sep. 1, 2009

(54) IMAGE DISPLAY DEVICE AND PROJECTOR (75) Inventors: Shoichi Uchiyama, Shimosuwa-machi (JP); Junichi Nakamura, Shiajiri (JP); Takashi Nitta, Chino (JP); Tsunemori Asahi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 769 days.

(21) Appl. No.: 11/363,181

(22) Filed: Feb. 28, 2006

(65) Prior Publication Data

US 2006/0203202 A1 Sep. 14, 2006

(30) Foreign Application Priority Data

Mar. 9, 2005 (JP) ............................. 2005-066090

(51) Int. Cl.
*G03B 21/14* (2006.01)
(52) U.S. Cl. ............................. 353/30; 353/94; 349/74; 348/758
(58) Field of Classification Search .................. 353/30, 353/31, 94; 349/74–83; 348/758
See application file for complete search history.

(56) References Cited

U.S. PATENT DOCUMENTS

| 5,978,142 A * | 11/1999 | Blackham et al. ............ 359/618 |
| 7,002,533 B2 * | 2/2006 | Sayag ............................. 345/7 |
| 7,175,279 B2 * | 2/2007 | Drazic et al. .................... 353/31 |
| 7,236,285 B2 * | 6/2007 | Uchiyama et al. ............. 359/242 |
| 7,359,008 B2 * | 4/2008 | O'Donnell et al. .............. 349/9 |
| 7,413,309 B2 * | 8/2008 | Whitehead et al. ............. 353/30 |
| 7,431,460 B2 * | 10/2008 | Hall et al. ....................... 353/30 |
| 7,453,475 B2 * | 11/2008 | Nitta et al. .................... 345/690 |
| 2005/0174495 A1 * | 8/2005 | Itoh et al. ...................... 348/758 |
| 2007/0040989 A1 * | 2/2007 | Weng et al. ..................... 353/30 |
| 2008/0192155 A1 * | 8/2008 | Uchiyama ....................... 349/8 |

FOREIGN PATENT DOCUMENTS

| JP | A-4-81714 | 3/1992 |
| JP | A-5-224155 | 9/1993 |
| JP | A 2000-305472 | 11/2000 |
| JP | A 2001-100689 | 4/2001 |
| JP | 2001-264728 | 9/2001 |
| JP | 2004-37702 | 2/2004 |
| JP | A 2004-523001 | 7/2004 |

OTHER PUBLICATIONS

Seetzen, H., et al. "A High Dynamic Range Display Using Low and High Resolution Modulators." SID 03 Digest, 2003, pp. 1450-1453.
Debevec, P, et al. "Recovering High Dynamic Range Radiance Maps from Photographs." Univ. of CA at Berkley, Computer Science Division.

* cited by examiner

*Primary Examiner*—William C Dowling
(74) *Attorney, Agent, or Firm*—Oliff & Berridge PLC (57) ABSTRACT An image display device that displays an image by modulating a light from a light source according to display image data, includes: a first light modulation element that modulates a light emitted from the light source; and a second light modulation element that is disposed on an optical path in series with the first light modulation element and modulates a light exiting from the first light modulation element, wherein the first light modulation element and the second light modulation element are disposed in such a manner that a bright-field direction of an optical image of the first light modulation element and a bright-field direction of the second light modulation element almost coincide with each other.

10 Claims, 8 Drawing Sheets

180 LIGHT VALVE DRIVING DEVICE
182 STORAGE DEVICE

IMAGE DISPLAY DEVICE AND PROJECTOR

BACKGROUND

1. Technical Field

The present invention relates to a device that displays an image by modulating a light from a light source via plural light modulation elements, and more particularly, to an image display device and a projector suitable to achieve a wider luminance dynamic range and a greater number of gradation steps.

2. Related Art

Improvements of an image quality in recent years with electronic display devices, such as an LCD (Liquid Crystal Display), an EL (Electro-luminescence) display, a plasma display, a CRT (Cathode Ray Tube), and a projector, are remarkable. A device with the ability comparable to the characteristics of human vision as to resolution and color gamut is now being achieved. However, the reproducible range of the luminance dynamic range is limited to a range of the order of 1 to $10^2$ [nit], and the gradation steps is normally expressed by 8 bits. On the other hand, the luminance dynamic range perceivable by the human vision at a time is in a range of the order of $10^{-2}$ to $10^4$ [nit], and luminance discretion is 0.2 [nit], which is equivalent to 12 bits in terms of gradation steps. When a display image of today's display device is viewed through such vision characteristics, the narrowness of the luminance dynamic range is outstanding. In addition, because gradation in a shadow portion and a highlight portion is insufficient, the viewer is not completely satisfied with a display image in terms of reality and a visual impact.

Meanwhile, the mainstream of the CG (Computer Graphics) used in movies, games, etc. is to pursue the reality of a picture by providing display data with a luminance dynamic range and the gradation characteristic closer to those of the human vision (hereinafter, such display data is referred to as HDR (High Dynamic Range) display data). However, because the ability of a display device to display the HDR display data is inadequate, there is a problem that the expression capability inherent to CG contents is not fully exerted.

Further, for the next-generation OS (Operating System), the adaptation of a 16-bit color space is planned, and the dynamic range and the gradation steps will be widened and increased markedly in comparison with the current 8-bit color space. Hence, the need for an electronic display device capable of fully expressing the 16-bit color space by achieving a high dynamic range and a greater number of gradation steps is expected to increase.

Of the display devices, a projection type display device (projector), such as a liquid crystal projector and a DLP™ (Digital Light Processing) projector, is able to display an image on a large screen, and is therefore a display device effective when rendering a display image with reality and a visual impact. In this field, proposals as follows have been made to solve the problems discussed above.

The technique disclosed, for example, in JP-T-2004-523001 is an example of a display device achieving a high dynamic range. This display device includes a light source, a second light modulation element that modulates luminance of a light in all the wavelength regions, and a first light modulation element that modulates luminance of a light in each of the wavelength regions for three primary colors, RGB, among wavelength regions of the light. A light from the light source is modulated by the second light modulation element to form a desired luminance distribution, and the resultant optical image is formed on the display surface of the first light modulation element to modulate colors, so that a secondary-modulated light is projected. All the pixels in the second light modulation element and the first light modulation element are controlled individually according to a first control value and a second control value determined on the basis of the HDR display data. A transmissive modulation element having a pixel structure or a segment structure in which transmissivity can be controlled independently and capable of controlling a two-dimensional transmissivity distribution is used as the light modulation element. A good example is a liquid crystal light valve. Alternatively, the transmissive modulation element may be replaced with a reflective modulation element. A good example in this case is a DMD (Digital Micromirror Device).

In the case where a light modulation element whose transmissivity is 0.2% for a dark display and 60% for a bright display is used, the luminance dynamic range of a single unit of the light modulation element is 60/0.2=300. The display device is equivalent to an array of light modulation elements having the luminance dynamic range of 300 and aligned optically in series. The display device is therefore able to achieve a luminance dynamic range of 300×300=90000. The same applies to the gradation steps, and gradation steps exceeding 8 bits can be achieved by aligning light modulation elements having 8-bit gradation optically in series.

JP-A-2001-100689 is also an example of the related art.

Incidentally, the liquid crystal light valve has normally a visual angle characteristic, and display characteristics, such as brightness and contrast, vary with a light exiting direction. It is therefore necessary for a display device using plural liquid crystal light valves, such as a liquid crystal projector, to adequately dispose plural liquid crystal light valves by taking the visual angle characteristic of each liquid crystal light valve into account, so that the highest display characteristic can be achieved.

However, the related art described above is silent about a concrete manner in which the liquid crystal light valves are disposed while taking their visual angle characteristics into account. When the liquid crystal light valves are disposed inadequately, inhomogeneity, such as irregular brightness and irregular colors, results in a display image or the contrast characteristic is deteriorated. This poses a problem that an image quality of the display image is deteriorated markedly.

SUMMARY

An advantage of the invention is to provide an image display device and a projector capable of obtaining a sharp image by enhancing the contrast characteristic.

The advantage can be achieved by the configurations as follows.

A first aspect of the invention provides an image display device that displays an image by modulating a light from a light source according to display image data. The image display device includes a first light modulation element that modulates a light emitted from the light source, and a second light modulation element that is disposed on an optical path in series with the first light modulation element and modulates a light exiting from the first light modulation element. The first light modulation element and the second light modulation element are disposed in such a manner that a bright-field direction of an optical image of the first light modulation element and a bright-field direction of the second light modulation element almost coincide with each other.

According to the first aspect of the invention, a light emitted from the light source is modulated by the first light modulation element first, and then modulated by the second light modulation element. In this instance, because the bright-field direction of the optical image of the first light modulation element and the bright-field direction of the second light modulation direction almost coincide with each other, the contrast characteristic of the optical image of the first light modulation element can be enhanced to the maximum. The homogeneity and the contrast characteristic of an image exiting from the second light modulation element are therefore enhanced, which enables a sharp image to be obtained.

It is preferable that the image forming device further includes an image forming system that forms the optical image of the first light modulation element on a light-receiving surface of the second light modulation element.

Brightness, chromaticity, contrast, etc. can be made uniform in a reliable manner by providing the image forming system, and the image display quaintly can be satisfactorily. It is preferable that the image forming system is an inverted image forming portion, and that the bright-field direction of the optical image of the first light modulation element and the bright-field direction of the second light modulation element almost coincide with each other while the first light modulation element and the second light modulation element are disposed to be rotational symmetric by 180° about an optical axis.

A light emitted from the light source is modulated by the first light modulation element. The optical image thus modulated is formed as an inverted image on the light-receiving surface of the second light modulation element because the image forming portion is the inverted image forming portion. Even when the optical image exiting from the first light modulation element is rotated by 180° as described above, because the first light modulation element and the second light modulation element, which originally have the same bright-field direction, are disposed to be rotational symmetric by 180° about the optical axis, the bright-field directions coincide with each other also in a case where the inverted image forming portion is used. The homogeneity and the contrast characteristic of an image exiting from the second light modulation element can be therefore enhanced, which enables a sharp image to be obtained.

It is preferable that an opening in a unit pixel of the first light modulation element and an opening in a unit pixel of the second light modulation element are of substantially an identical shape.

Because the openings in the unit pixels of the first light modulation element and the second light modulation are of substantially the identical shape, the shape of the opening of the first light modulation element almost matches with the shape of the opening in the pixel unit of the second light modulation element. Hence, little or no light exiting from the first light modulation element will be shielded by the second light modulation element. Efficiency for light of utilization can be thus enhanced.

It is preferable that the first light modulation element is formed of plural light modulation elements each modulating a different color light, and that the image display device further includes a dichroic prism that combines lights modulated in the plural light modulation elements while the bright-field direction of the second light modulation element is adjusted in reference to a bright-field direction of a light modulation element from which a light that passes through the dichroic prism exits.

Because the second light modulation element is disposed in reference to the bright-field direction of the light modulation element from which a light that passes through the dichroic prism exits, the bright-field directions can be made to coincide with each other in a simple manner. This not only prevents an increase of the overall device in size, but also saves the cost because the components can be fewer.

A second aspect of the invention provides a projector that includes the image display device as described above, and a projection system that projects a light exiting from image display device.

According to the second aspect of the invention, an image exiting from the image display device is projected by means of the projection system. As has been described, because the image display device has an excellent contrast characteristic, it is possible to obtain a display image in a high dynamic range having an excellent gradation characteristic.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of an image display device and a projector of the invention will be described with reference to the drawings.

First Embodiment of Projector

Figure 1:
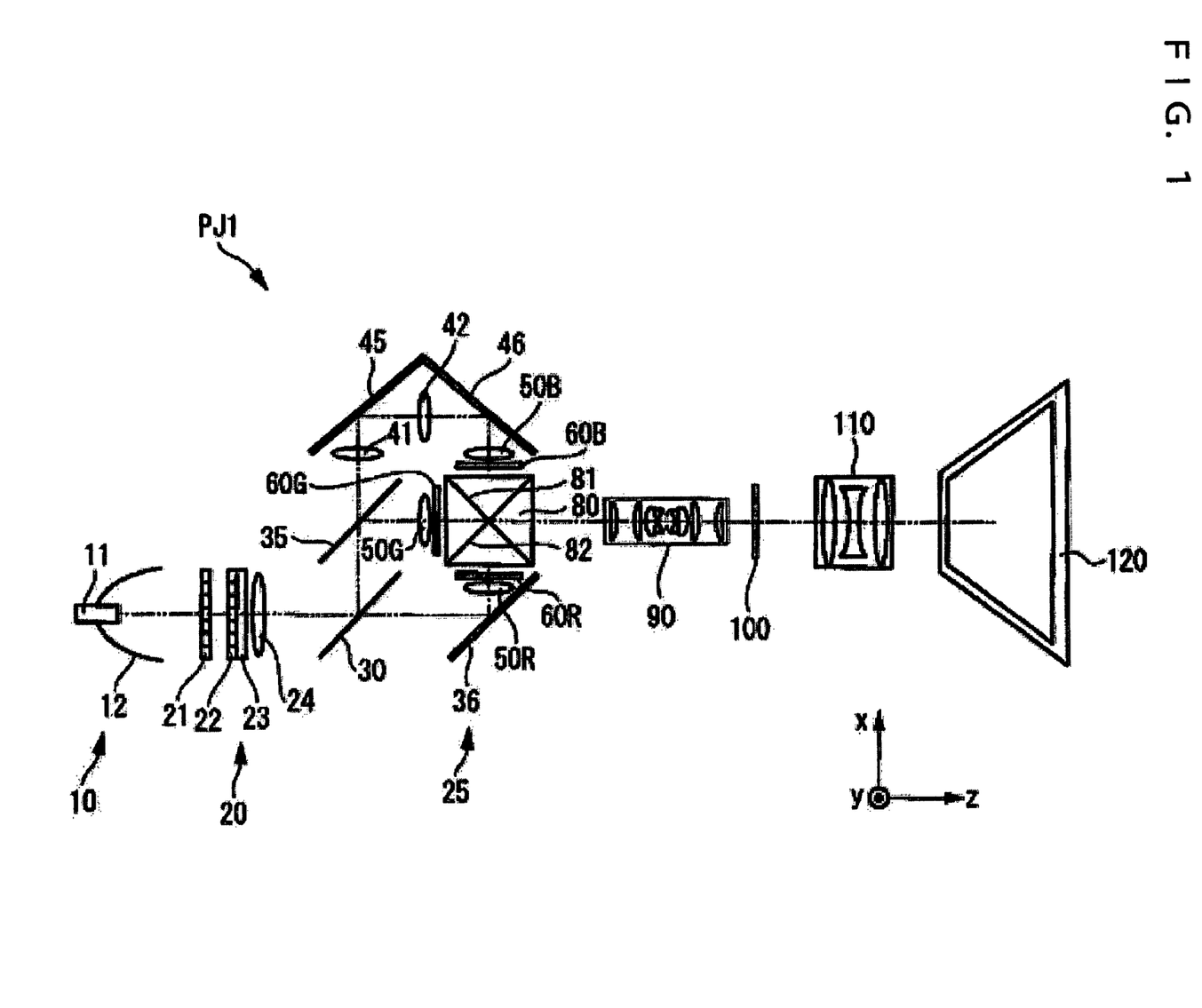
FIG. 1 is a view schematically showing a projector according to a first embodiment of the invention.

FIG. 1 is a view showing the major optical configuration of a projection type liquid crystal display device (projector) PJ1.

The projector PJ1 comprises an image display device including: a light source 10; a uniform illumination system 20 that makes a luminance distribution of a light coming incident thereon from the light source 10 uniform; a color modulation portion 25 that modulates luminance of three primary colors, RGB, among the wavelength regions of a light coming incident thereon from the uniform illumination system 20 (including three transmissive liquid crystal light valves as a first modulation element, that is, a transmissive liquid crystal light valve 60B for a blue light, a transmissive liquid crystal light valve 60G for a green light, and a transmissive liquid crystal light valve 60R for a red light); a relay lens 90 that relays a light coming incident thereon from the color modulation portion 25; and a transmissive liquid crystal light valve 100 serving as a second modulation portion that modulates luminance of a light coming incident thereon from the relay lens 90 in all the wavelength regions, and a projection lens (projection system) 110 that projects a light coming incident thereon from the liquid crystal light valve 100 onto a screen 120.

The light source 10 includes a lamp 11 comprising an extra-high pressure mercury vapor lamp or a xenon lamp, and a reflector 12 that reflects or collects a light emitted from the lamp 11.

Hereinafter, assume that in the xyz orthogonal coordinate system of the overall optical system, a pixel surface of the transmissive liquid crystal light valve 100 is defined as the xy plane, and the direction of a light exiting from a cross dichroic prism 80 and heading toward the projection lens 110 is defined as the z direction.

The uniform illumination system 20 comprises first and second lens arrays 21 and 22 formed of fly-eye lenses or the like, a polarization conversion element 23, and a collector lens 24. The luminance distribution of a light emitted from the light source 10 is made uniform by the first and second lens arrays 21 and 22. A light having passed through the first and second lens arrays 21 and 22 is then polarized by the polarization conversion element 23 to a polarization direction in which the light is allowed to go incident on the color modulation portion 25. The polarized light is collected by the collector lens 24 so that it exits toward the color modulation portion 25. The polarization conversion element 23 is formed of, for example, a PBS array and a ½ wave plate, and converts a random polarized light to a specific linear polarized light.

The color modulation portion 25 comprises two dichroic mirrors 30 and 35 serving as light separation portions, three mirrors (reflection mirrors 36, 45, and 46), five field lenses (a lens 41, a relay lens 42, parallelizing lenses 50B, 50G, and 50R), three liquid crystal light valves 60B, 60G, and 60R, and a cross dichroic prism 80.

The dichroic mirrors 30 and 35 separate (isolate) a light (a white light) from the light source 10 to lights of three primary colors, RGB representing red (R), green (G), and blue (B). The dichroic mirror 30 comprises a glass plate or the like and a dichroic filter formed on the glass plate and having a property of reflecting a B light and a G light and transmitting an R light. Of a white light from the light source 10, it reflects a B light and a G light and transmits an R light included in the white light. The dichroic mirror 35 comprises a glass plate or the like and a dichroic filter formed on the glass plate and having a property of reflecting a G light and transmitting a B light. Of the G light and the B light reflected on the dichroic mirror 30, it reflects the G light so that it is conveyed to the parallelizing lens 50G, and transmits the B light so that it is conveyed to the lens 41.

The relay lens 42 conveys a light (light intensity distribution) in the vicinity of the lens 41 to the vicinity of the parallelizing lens 50B. The lens 41 is furnished with a function of allowing a light to go incident on the relay lens 42 efficiently. The B light that comes incident on the lens 41 is conveyed to the spatially remote liquid crystal light valve 60B while maintaining the intensity distribution almost intact and hardly causing a light loss.

The parallelizing lenses 50B, 50G, and 50R are furnished with functions of making lights of respective colors that go incident on the corresponding liquid crystal light valves 60B, 60G, and 60R substantially parallel, so that lights having passed through the liquid crystal light valves 60B, 60G, and 60R go incident on the relay lens 90 efficiently. Lights of three primary colors, RGB, separated by the dichroic mirrors 30 and 35 go incident on the liquid crystal light valves 60B, 60G, and 60R via the mirrors (the reflection mirrors 36, 45, and 46) and the lenses (the lens 41, the relay lens 42, and the parallelizing lenses 50B, 50G, and 50R) described above.

Each of the liquid crystal light valves 60B, 60G, and 60R is an active-matrix liquid crystal display element comprising a glass substrate, on which pixel electrodes and switching elements to drive the pixel electrodes, such as thin-film transistor elements and thin-film diodes, are formed in a matrix fashion, a glass substrate on which a common electrode is formed entirely, TN-type liquid crystal sandwiched between these substrates, and polarizers disposed on the outer surfaces.

The liquid crystal light valves 60B, 60G, and 60R are driven in a normally white mode in which they are in a white/bright (transmissive) state while no voltage is applied and in a black/dark (non-transmissive) state while a voltage is applied or in an opposite normally black mode. The gradation from bright to dark is controlled in an analog manner according to a control value being given. The liquid crystal light valve 60B modulates a B light coming incident thereon according to display image data, and a modulated light is emitted from the liquid crystal light valve 60B. The liquid crystal light valve 60G modulates a G light coming incident thereon according to display image data, and a modulated light is emitted from the liquid crystal light valve 60G. The liquid crystal light valve 60R modulates an R light coming incident thereon according to display image data, and a modulated light is emitted from the liquid crystal light valve 60B.

The cross dichroic prism 80 is of a structure in which four rectangular prisms are laminated to each other, and inside the structure are formed a dielectric multi-layer filter that reflects a B light (B light reflecting dichroic filter 81) and a dielectric multi-layer filter that reflects an R light (R light reflecting dichroic filter 82) with their cross sections placed in the form of a letter X. It therefore transmits a G light from the liquid crystal light valve 60G and bends an R light from the liquid crystal light valve 60R and a B light from the liquid crystal light valve 60B to combine these lights of three colors for a color image to be formed.

Figure 2:
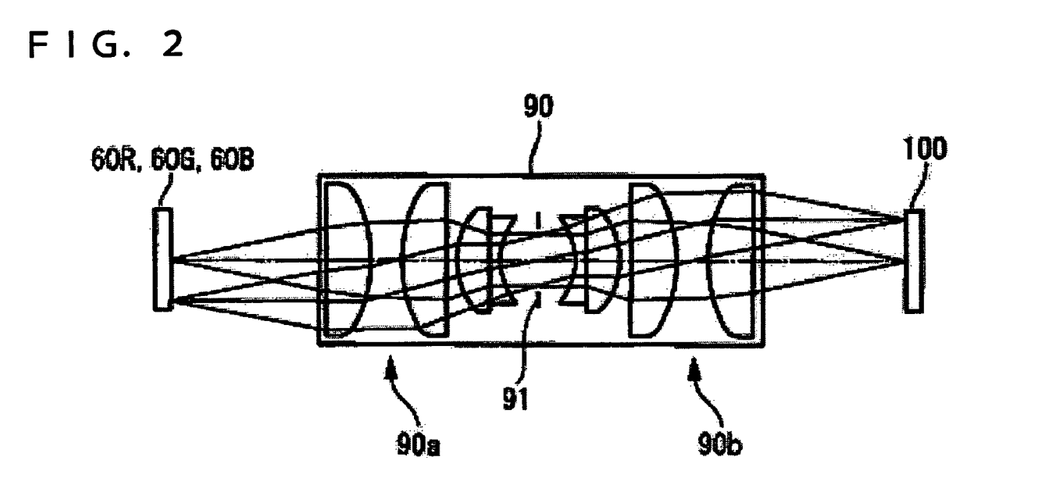
FIG. 2 is a view showing the configuration of a relay system of FIG. 1.

FIG. 2 is a view showing the configuration of the relay lens (image forming system) 90.

The relay lens 90 conveys optical images (light intensity distributions) from the liquid crystal light valves 60B, 60G, and 60R that are combined in the cross dichroic prism 80 to the pixel surface (light-receiving surface) of the liquid crystal light valve 100. Because the relay lens 90 used in this embodiment is an inverted image forming portion, images exiting from the liquid crystal light valves 60B, 60G, and 60R are formed on the liquid crystal light valve 100 via the relay lens 90 as an inverted image.

Regarding the relay lens 90 shown in FIG. 2, the cross dichroic prism 80 disposed between the liquid crystal light valves 60B, 60G, and 60R and the relay lens 90 is omitted for ease of description. However, it is optically equivalent to the configuration of the projector PJ1 shown in FIG. 1.

The relay lens 90 is a same-size image forming lens comprising a first-half lens group 90a and a second-half lens group 90b disposed to be almost symmetric with respect to an aperture diaphragm 91. It is preferable for the relay lens 90 to have a both-sides telecentric characteristic by taking the view angle characteristic of liquid crystal into account. For the relay lens 90, the image side focal position of the first-half lens group 90a, the aperture diaphragm 91, and the object side focal position of the second-half lens group 90b are made to coincide with one another, and the liquid crystal light valves 60B, 60G, and 60R are disposed at the object side focal position of the first-half lens group 90a while the liquid crystal light valve 100 is disposed at the image side focal position of the second-half lens group 90b. The first-half lens group 90a and the second-half lens group 90b include plural convex lenses and concave lenses. It should be noted, however, that the shape, the size, intervals, and the number of the lenses, and the telecentric characteristic, the magnification, and other lens characteristics of the lenses can be changed as needed to meet the required characteristics, and the lens groups are not limited to the example shown in FIG. 2.

As is shown in FIG. 1, the liquid crystal light valve 100 is of the same configuration as the liquid crystal light valves 60B, 60G, and 60R as described above. It modulates luminance of a light coming incident thereon in all the wavelength regions according to the display image data, and a modulated light is emitted from the liquid crystal light valve 100 toward the projection lens 110.

Further, the liquid crystal light valves 60B, 60G, and 60R and the liquid crystal light valve 100 are disposed in such a manner that the bright-field directions of optical images of the liquid crystal light valves 60B, 60G, and 60R and the bright-field direction of the liquid crystal light valve 100 are made to almost coincide with each other.

A method of making the bright-field directions of the optical images of the liquid crystal light valves 60B, 60G, and 60R and the bright-field direction of the liquid crystal light valve 100 coincide with each other will now be described concretely.

The liquid crystal light valves 60B, 60G, 60R, and 100 have the vision angle characteristic that the optical characteristic varies with a light exiting direction. This is a characteristic attributed to the configuration that liquid crystal molecules having optical anisotropy are aligned in a specific direction within the liquid crystal layer. Hereinafter, a display method of the vision angle characteristic will be described with reference to FIGS. 3A and 3B. The orthogonal coordinate system used in FIGS. 3A and 3B indicates the same directions as those of the xyz orthogonal coordinate system described with reference to FIG. 1.

Figure 3A:
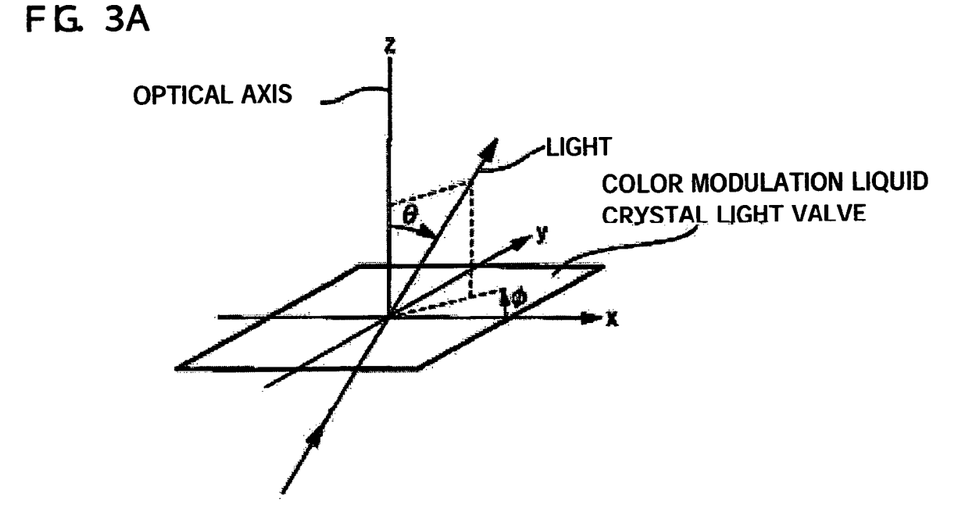
FIG. 3A is a view showing a bright-field direction of a liquid crystal light valve of FIG. 1.

As is shown in FIG. 3A, the traveling direction of lights exiting from the liquid crystal light valves 60B, 60G, 60R, and 100 is defined with the polar angle θ and the azimuth angle φ. More specifically, an angle produced by the traveling direction of lights after they exit from the liquid crystal light valves 60B, 60G, 60R, and 100 and the z axis is defined as the polar angle θ. Also, an angle produced by a projection (dotted line) of the light traveling direction onto the xy plane and the x axis is defined as the azimuth angle φ by setting a positive direction to the counterclockwise direction starting from the x axis.

Figure 3B:
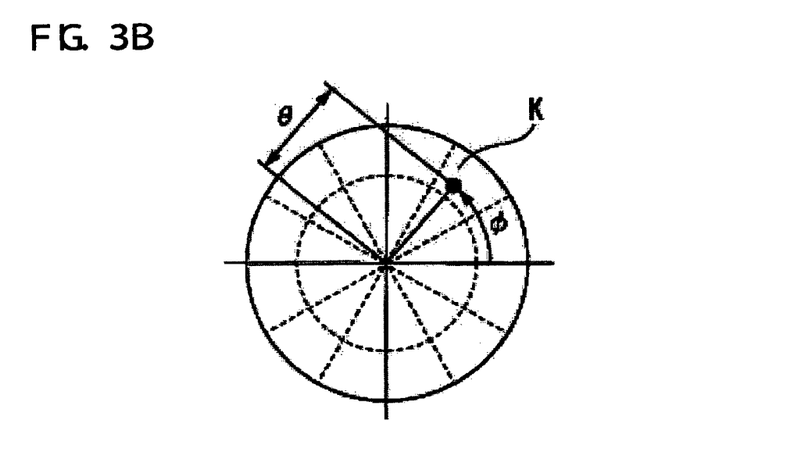
FIG. 3B is another view showing the bright-field direction of the liquid crystal light valve of FIG. 1.

The vision angle characteristics of the liquid crystal light valves 60B, 60G, 60R, and 100 are indicated using the vision angle characteristic chart shown in FIG. 3B. The characteristic value or the characteristic at a point K on the vision angle characteristic chart represents the characteristic value or the characteristic of a light when θ is given as a distance between the point K and the origin and φ as the angle produced by the horizontal axis and the point K. For the angle φ produced by the horizontal axis and the point K, a positive direction is set to the counterclockwise direction starting from the horizontal axis of the vision angle characteristic chart.

Figure 4A:
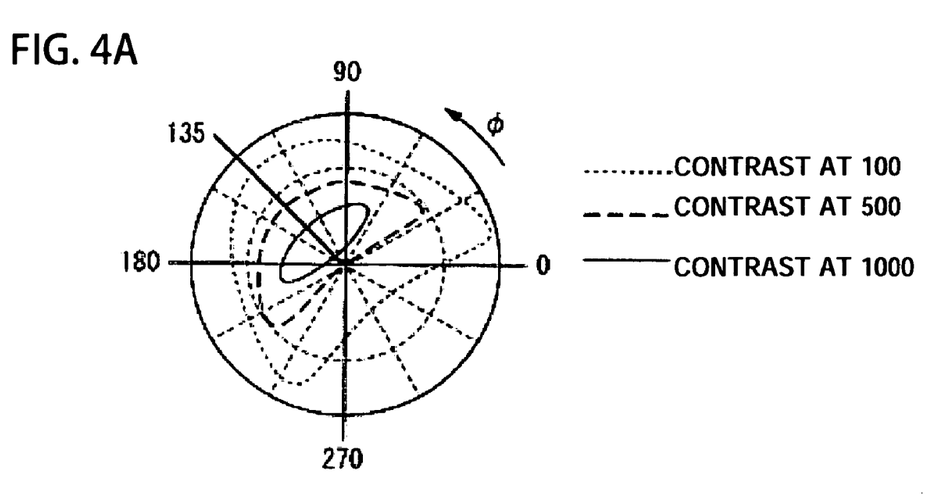
FIG. 4A is a view showing contrast curves of the liquid crystal light valve of FIG. 1.

FIG. 4A shows an example of the contrast vision angle characteristic of the liquid crystal light valves 60B, 60G, 60R, and 100. FIG. 4A shows regions when the contrast is 100, 500, and 1000 . As can be understood from FIG. 4A, the contrast characteristic is not isotropic, and the azimuth angle φ is present in a 135° direction for a high contrast region. Herein, the azimuth direction φ at which a region having the highest contrast characteristic is present is referred to as the bright-field direction.

Figure 4B:
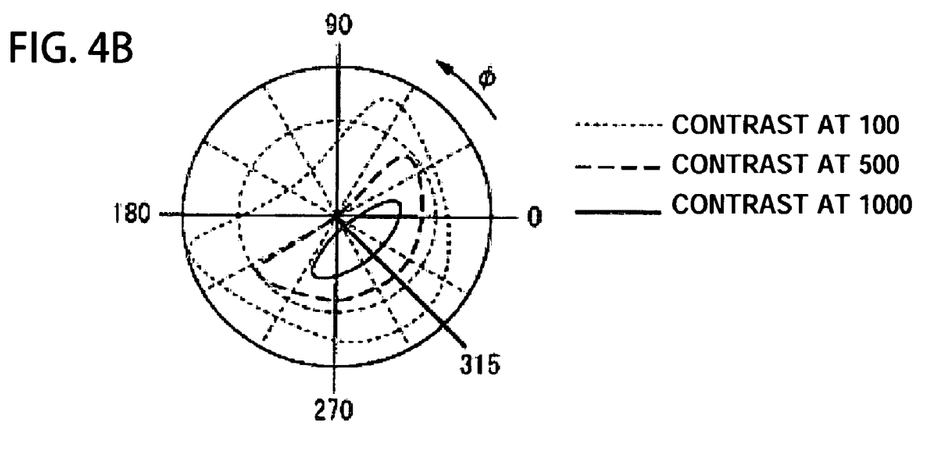
FIG. 4B is another view showing the contrast curves of the liquid crystal light valve of FIG. 1.

As has been described, because the relay lens 90 forms an inverted image of an image exiting from the liquid crystal light valve, when the liquid crystal light valves 60B, 60G, and 60R having the characteristic shown in FIG. 4A are used, the contrast visual field characteristics of images of the liquid crystal light valves 60B, 60G, and 60R having passed through the relay lens 90 are, as is shown in FIG. 4B, characteristics rotated by 180° about the z axis. Hence, in order to increase the contrast characteristic of an image to be projected onto the screen 120 to the maximum, there is a need to set the bright-field direction of the liquid crystal light valve 100 to a 315° direction that is substantially equivalent to the one shown in FIG. 4B.

Figure 5:
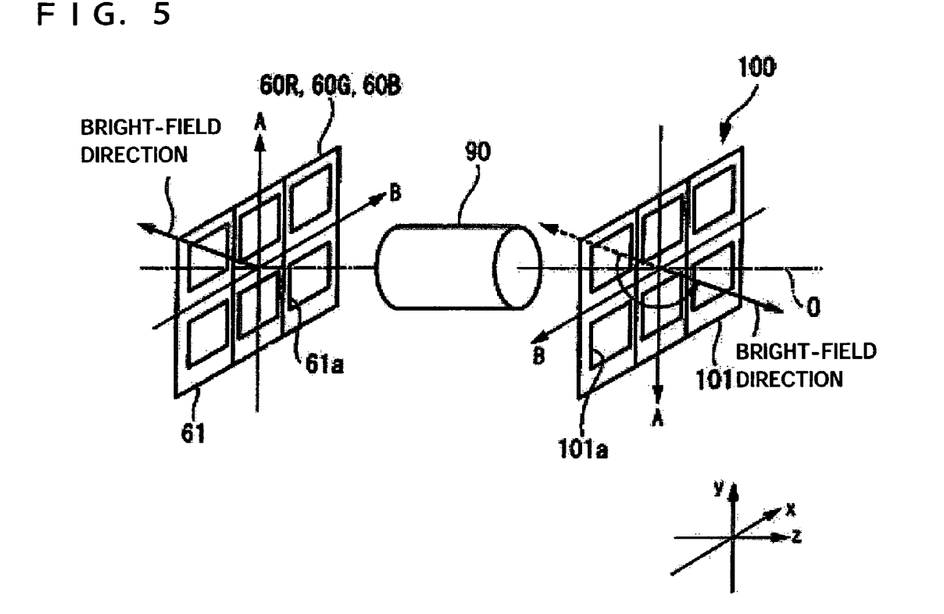
FIG. 5 is a view showing the bright-field direction of the liquid crystal light valve of FIG. 1.

As a method to meet this need, the liquid crystal light valve 100 is disposed to be rotational symmetric by 180° about the optical axis in reference to the liquid crystal light valves 60B, 60G, and 60R. The liquid crystal light valves 60B, 60G, and 60R and the liquid crystal light valve 100 used herein have almost the same bright-field direction, and an opening 61a in a unit pixel 61 of the liquid crystal light valves 60B, 60G, and 60R and an opening 101a in a unit pixel 101 of the liquid crystal light valve 100 are of the shapes having substantially the same size (in the example shown in the drawing, only six unit pixels 61 and six unit pixels 101 are shown). In other words, as is shown in FIG. 5, liquid crystal light valves having almost the same bright-field direction are used as the liquid crystal light valves 60B, 60G, and 60R and the liquid crystal light valve 100, and the liquid crystal light valves 60B, 60G, and 60R are disposed in such a manner that the direction A and the direction B of the liquid crystal light valves 60B, 60G, and 60R are set, respectively, in the +y direction and the +x direction. Meanwhile, the liquid crystal light valve 100 is rotated by 180° about the optical axis in reference to the liquid crystal light valves 60B, 60G, and 60R, while the direction A and the direction B are set to the −y direction and the −x direction, respectively. When disposed in this manner, it is possible to make the bright-field directions of optical images of the liquid crystal light valves 60B, 60G, and 60R formed by the relay lens 90 and the bright-field direction of the liquid crystal light valve 100 coincide with each other.

When this method is used, the liquid crystal orientation does not have to be adjusted specifically to make the bright-field directions coincide with each other for the liquid crystal light valve 100. It is thus possible to enhance the productivity of the products.

In the description referring to FIG. 5, the cross dichroic prism 80 was omitted. However, the bright-field directions of the respective liquid crystal light valves 60B, 60G, and 60R are actually set in such a manner that the bright-field directions of the optical images of the respective liquid crystal light valves 60B, 60G, and 60R coincide with one another when combined optically in the cross dichroic prism 80. The bright-field directions of the liquid crystal light valves 60B, 60G, and

60R in the description referring to FIG. 5 therefore mean the bright-field directions of the optical images combined optically in the cross dichroic prism 80.

Further, the bright-field directions of the optical images combined optically in the cross dichroic prism 80 are normally made to coincide with the bright-field direction of the liquid crystal light valve (in this embodiment, the liquid crystal light valve 60G for transmitting a G light) from which a light that passes through the cross dichroic prism 80 exits. Therefore, in the configuration of FIG. 5, a liquid crystal light valve same as the liquid crystal light valve 60G for transmitting a G light is used as the liquid crystal light valve 100. Furthermore, the liquid crystal light valve 100 is rotated by 180° about the optical axis in reference to the liquid crystal light valve 60G for transmitting a G light.

The projection lens 110 projects an optical image formed on the display surface of the liquid crystal light valve 100 onto the screen 120 for a color image to be displayed.

The liquid crystal light valves 60B, 60G, and 60R and the liquid crystal light valve 100 are the same in that they modulate the intensity of a transmitted light and bear optical images corresponding to the degree of modulation. However, they are different in that the liquid crystal light valve 100 modulates a light (white light) in all the wavelength regions, whereas the liquid crystal light valves 60B, 60G, and 60R modulate lights in specific wavelength regions (lights of colors, such as R, G and B lights) separated in the dichroic mirrors 30 and 35 serving as the light separation portions. For this reason, the light intensity modulation performed by the liquid crystal light valves 60B, 60G, and 60R is referred to as color modulation, and the light intensity modulation performed by the liquid crystal light valve 100 is referred to as luminance modulation for the purpose of distinction.

From the same point of view, hereinafter, the liquid crystal light valves 60B, 60G, and 60R are referred to as the color modulation light valves, and the liquid crystal light valve 100 is referred to as the luminance modulation light valve for distinction.

An overall flow to convey a light in the projector PJ1 will now be described. A white light from the light source 10 is separated into lights of three primary colors including red (R), green (G), and blue (B) by the dichroic mirrors 30 and 35, and the separated lights go incident on the corresponding liquid crystal light valves 60B, 60G, and 60R via the lenses including the parallelizing lenses 50B, 50G, and 50R and the mirrors. The lights of respective colors coming incident on the liquid crystal light valves 60B, 60G, and 60R are modulated in color according to the outside data corresponding to their respective wavelength regions, and exit as modulated lights bearing optical images. The respective modulated lights from the liquid crystal light valves 60B, 60G, and 60R independently go incident on the cross dichroic prism 80, and are combined therein into a single light.

Thereafter, the light exiting from the cross dichroic prism 80 goes incident on the liquid crystal light valve 100 via the relay lens 90. In this instance, the bright-field direction of the optical image of the light exiting from the cross dichroic prism 80 is rotated by 180° by the relay lens 90, and is thereby made to coincide with the bright-field direction of the liquid crystal light valve 100. The combined light coming incident on the liquid crystal light valve 100 is modulated in luminance according to the outside data corresponding to all the wavelength regions, and exits to the projection lens 110 as a modulated light bearing the final optical image. The projection lens 110 then projects the final combined light from the liquid crystal light valve 100 onto the screen 120 for a desired image to be displayed.

As has been described, the projector PJ1 adopts a mode in which a final display image is formed in the liquid crystal light valve 100 serving as the second light modulation element using modulated lights forming the optical images (images) in the liquid crystal light valves 60B, 60G, and 60R serving as the first light modulation element. Herein, a light from the light source 10 is modulated through the two-step image forming process via the two light modulation elements (the color modulation light valves and the luminance modulation light valve) disposed in series. The image forming process is described, for example, in Helge Seetzen, Lorne A. Whitehead, "A High Dynamic Range Display Using Low and High Resolution Modulators", *SID Symposium* 2003, pp. 1450-1453, 2003. The projector PJ1 is thus able to achieve a wider luminance dynamic range and a greater number of gradation steps.

The projector PJ1 is further provided with a display control device 200 that controls the projector PJ1.

Figure 6:
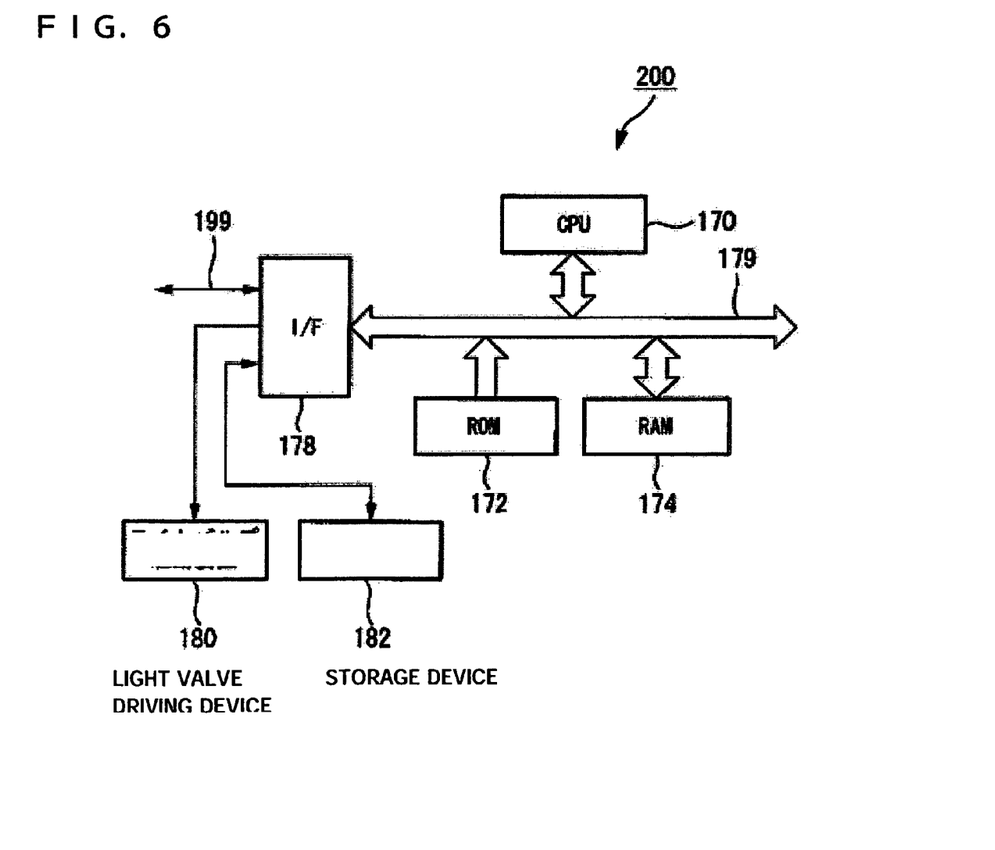
FIG. 6 is a block diagram showing the hardware configuration of a display control device used in the projector according to the first embodiment of the invention.

FIG. 6 is a block diagram showing the hardware configuration of the display control device 200.

As is shown in FIG. 6, the display control device 200 comprises a CPU 170 that performs computations and controls the overall system by running the control program, a ROM 172 that pre-stores the control program of the CPU 170 and the like in a specified region, a RAM 174 that stores data read out from the ROM 172 or the like and the computation result needed for the CPU 170 during its computation process, and an I/F 178 that serves as a medium for inputting/outputting data to/from the outside devices. These components are interconnected via a bus 179 serving as a data transfer signal line to enable mutual data transmission.

The I/F 178 is connected to outside devices, such as a light valve driving device 180 that drives the luminance modulation light valve and the color modulation light valves, a storage device 182 that stores data, a table, etc. in the form of files, and a signal line that establishes a connection with an outside network 199.

The storage device 182 stores HDR display data used to drive the luminance modulation light valve and the color modulation light valves, and a control value registration table.

In this embodiment, the projector PJ1 is configured to control transmissivity of the liquid crystal light valves 60B, 60G, and 60R and the liquid crystal light valve 100 by means of the display control device 200 according to an HDR video signal and RGB from the outside, so that an HDR image is displayed on the screen 120.

The HDR image data is image data that can achieve a high luminance dynamic range that cannot be achieved by an image format, such as sRGB, in the related art. A pixel value indicating the luminance level of the pixel is stored for all the pixels forming the image. In a format used as the HDR display data in this embodiment, a pixel value that indicates the pixel level for each of the three primary colors, RGB, as a floating point value, is stored for each pixel. For example, values, (1.2, 5.4, 2.3), are stored as the pixel value for a single pixel.

Also, an HDR image in a high luminance dynamic range is captured and the HDR image data is generated on the basis of the HDR image.

The generation method of the HDR image data is described in detail, for example, in a known paper, P. E. Debevec, J. Malik, "Recovering High Dynamic Range Radiance Maps from Photographs", *Proceedings of ACM SIGGRAPH97*, pp. 367-378, 1997.

As has been described, the projector PJ1 of this embodiment is able to subject a light having undergone primary modulation in specific pixels in the color modulation light valves 60R, 60G, and 60B to secondary modulation adequately in a specific region (pixels) in the luminance modulation light valve 100. It is thus possible to obtain an image having a specific quality in a reliable manner in comparison with the related art.

In addition, because the bright-field directions of the optical images of the color modulation light valves 60R, 60G, and 60B coincide with the bright-field direction of the luminance modulation light valve 100, it is possible to increase the contrast characteristic of the optical images of the color modulation light valves 60R, 60G, and 60B to the maximum. This enhances the homogeneity and the contrast characteristic of an image exiting from the luminance modulation light valve 100, which enables a sharp image to be projected onto the screen 120.

The technical scope of the invention is not limited to the embodiment above, and the invention can be modified in various manners without deviating from the scope of the invention.

For example, the color modulation light valves 60R, 60G, and 60B, and the luminance modulation light valve 100 in the embodiment above may be replaced with color modulation light valves 65R, 65G, and 65B and a luminance modulation light valve 105 in which the shapes of the openings in the unit pixels (in the example shown in the drawing, only six unit pixels 61 and six unit pixels 101 are shown) are asymmetric. In this case, too, as is shown in FIG. 7A, the liquid crystal light valve 105 is disposed to be rotational symmetric by 180° about the optical axis in reference to the liquid crystal light valves 65B, 65G, and 65R in the same manner as in the embodiment above.

Figure 7A:
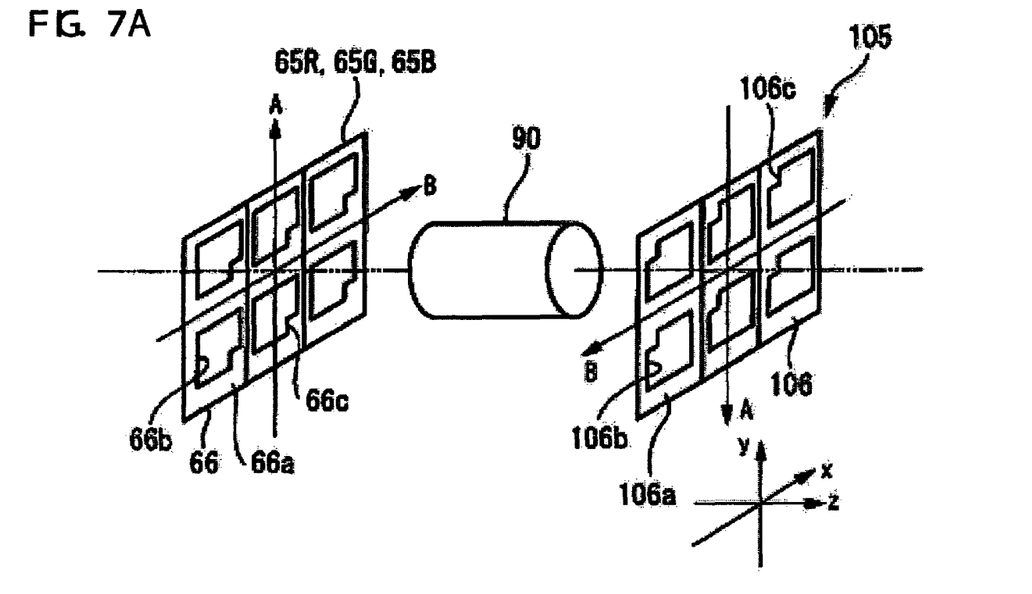
FIG. 7A is a view showing a modification of a color modulation light valve and a luminance modulation light valve of the projector according to the first embodiment of the invention.

As is shown in FIG. 7A, in the pixel structure of the color modulation light valves 65R, 65G, and 65B and the luminance modulation light valve 105, plural pixels are aligned in a matrix fashion, and the respective unit pixels 66 and 106 comprise, respectively, grid-like light shielding portions 66a and 106a made of a metal material, such as chromium, and rectangular openings 66b and 106b.

Each of the light shielding portions 66a and 106a is formed of a light shielding pattern film (a black stripe film, a black matrix film, etc.), in which strip-shaped portions of a specific width are aligned periodically, as well as pixel wires, TFT elements, etc. Light shielding portions 66c and 106c are provided, respectively, to the openings 66b and 106b at one corner. As has been described, the light shielding portions 66b and 106b are of asymmetric shapes.

Figure 7B:
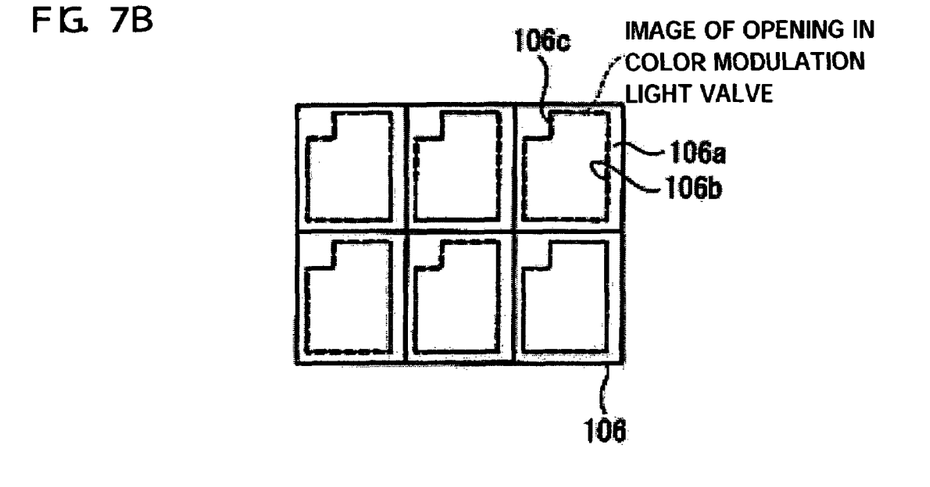
FIG. 7B is another view showing the modification of the color modulation light valve and the luminance modulation light valve of the projector according to the first embodiment of the invention.

When configured in this manner, lights exiting from the color modulation light valves 65R, 65G, and 65B are rotated by 180° by the relay lens 90, and then go incident on the liquid crystal light valve 105. In this instance, optical images having passed through the openings 66b in the liquid crystal light valves 65B, 65G, and 65R are of almost the same shape as the opening 106b in the liquid crystal light valve 105. Hence, as is shown in FIG. 7B, almost all the lights exiting from the liquid crystal light valves 65B, 65G, and 65R pass through the opening 106b in the liquid crystal light valve 105. Efficiency for utilization of light can be thereby enhanced.

Also, in the embodiment above, the liquid crystal light valves 60B, 60G, and 60R and the liquid crystal light valve 100 provided, respectively, with the openings 61a and the opening 101a of the shapes having substantially the same size are used. However, the openings may be of different sizes. The contrast characteristic can be enhanced only when the components are disposed in such a manner that the bright-field directions of the optical images of the liquid crystal light valves 60B, 60G, and 60R almost coincide with the bright-field direction of the liquid crystal light valve 100.

Figure 8:
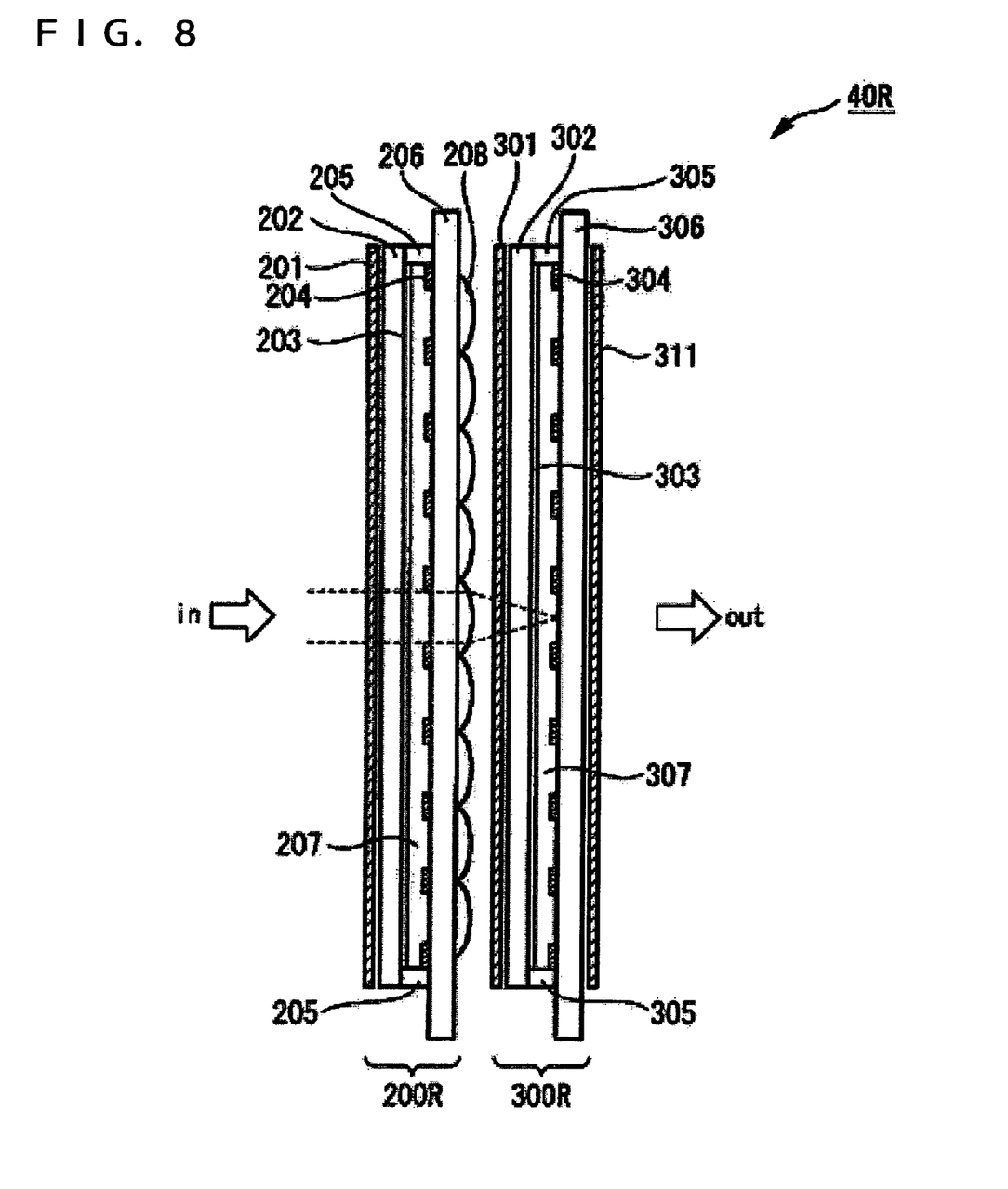
FIG. 8 is a cross section showing a modification of the color modulation light valve and the luminance modulation light valve of the projector according to the first embodiment of the invention.

Further, in the embodiment above, the relay lens 90 may be omitted from the projector PJ1. When configured in this manner, as is shown in FIG. 8, light modulation element groups 40R, 40G, and 40B comprising, respectively, liquid crystal light valves (luminance modulation light valves) 200R, 200G, and 200B in which plural pixels whose transmissivity can be controlled independently are aligned in a matrix fashion, and liquid crystal light valves (color modulation light valves) 300R, 300G, and 300B in which plural pixels whose transmissivity can be controlled independently are aligned in a matrix fashion, are disposed at the positions of the liquid crystal light valves 60B, 60G, and 60R instead of the liquid crystal light valves 60B, 60G, 60R, and 100. This case will be described with reference to FIG. 8 using the light modulation element group 40R for red as an example.

The liquid crystal light valve 200R comprises a polarizer 201, a counter substrate 202, a counter electrode 203, data wires 204, a sealing member 205, a panel substrate 206, liquid crystal 207, and a micro-lens array 208. The data wires 204 for respective pixels, pixel electrodes (not shown) aligned at regular intervals, and active elements (not shown) used to apply a control voltage to the pixel electrodes are formed on the panel substrate 206 on the light incident side (the side on which a light from the light source 10 comes incident). The counter electrode 203 is formed on the counter substrate 202. A space between the panel substrate 206 and the counter substrate 202 is filled with the liquid crystal 207, and the liquid crystal 207 is sealed by the sealing member 205. The polarizer 201 is laminated to the counter substrate 202 on the light incident side. Meanwhile, the micro-lens array 208 is laminated to the panel substrate 206 on the light exiting side (the side from which a light from the light source 10 exits) with the convex direction facing the light exiting side. The micro-lens array 208 can be manufactured by the manufacturing method disclosed, for example, in JP-A-2000-305472.

The liquid crystal light valve 300R comprises a polarizer 301, a counter substrate 302, a counter electrode 303, data wires 304, a sealing member 305, a panel substrate 306, liquid crystal 307, and a polarizer 311. The data wires 304 for the respective pixels, pixel electrodes (not shown) aligned at regular intervals, and active elements (not shown) used to apply a control voltage to the pixel electrodes are formed on the panel substrate 306 on the light incident side. The counter electrode 303 is formed on the counter substrate 302. A space between the panel substrate 306 and the counter substrate 302 is filled with the liquid crystal 307, and the liquid crystal 307 is sealed by the sealing member 305. The polarizer 301 is laminated to the counter substrate 302 on the light incident side. Meanwhile, the polarizer 311 is laminated to the panel substrate 306 on the light exiting side.

A light emitted from the homogenous illumination system 20 comes incident on the liquid crystal light valve 200R from the left (the direction, in) of FIG. 8, and is primary modulated therein. The optical image of the liquid crystal light valve 200R is then conveyed to the liquid crystal light valve 300R via the micro-lens array 208. In this instance, the optical image of the liquid crystal light valve 200R is collected by the micro-lens array 208 and formed on the pixel surface of the liquid crystal light valve 300R. The optical image can be therefore conveyed to the liquid crystal light valve 300R while suppressing a reduction in luminance caused by dispersion of the light or the like. Subsequently, the light from the liquid crystal light valve 200R is secondary modulated by the liquid crystal light valve 300R, and exits therefrom to the right (the direction, out) of FIG. 8 to be conveyed to the cross dichroic prism 80.

As has been described, according to the configuration by superimposing the color modulation light valve 300R, the micro-lens array 208, and the luminance modulation light valve 200R, the overall device can be reduced in size because the micro-lens array 208 is quite small in comparison with the relay lens 90. Further, because the micro-lens array 208 has fewer components than the relay lens 90, errors at the incorporated positions to the device can be fewer. An optical image of the luminance modulation light valve 200R can be therefore formed at relatively good accuracy on the pixel surface of the color modulation light valve 300R. In addition, because the luminance modulation light valve, the micro-lens array 208, and the color modulation light valve are disposed closely, a reduction in luminance caused by dispersion of light or the like can be further suppressed. Luminance of the display image can be thereby enhanced.

Also, in the embodiment above, as the method of making the bright-field directions of the optical images of the liquid crystal light valves 60B, 60G, and 60R and the bright-field direction of the liquid crystal light valve 100 coincide with each other, the liquid crystal light valve 100 having the same bright-field direction as those of the liquid crystal light valves 60B, 60G, and 60R is used, and disposed after it is rotated by 180°. However, the bright-field directions can be made to coincide with each other without having to rotate the liquid crystal light valve 100 by 180°. This can be achieved by changing the bright-field direction of the liquid crystal light valve 100 to a desired direction by controlling the rubbing direction of the liquid crystal cell, the kind of chiral materials added to the liquid crystal, a pre-tilting angle, etc.

Figure 9A:
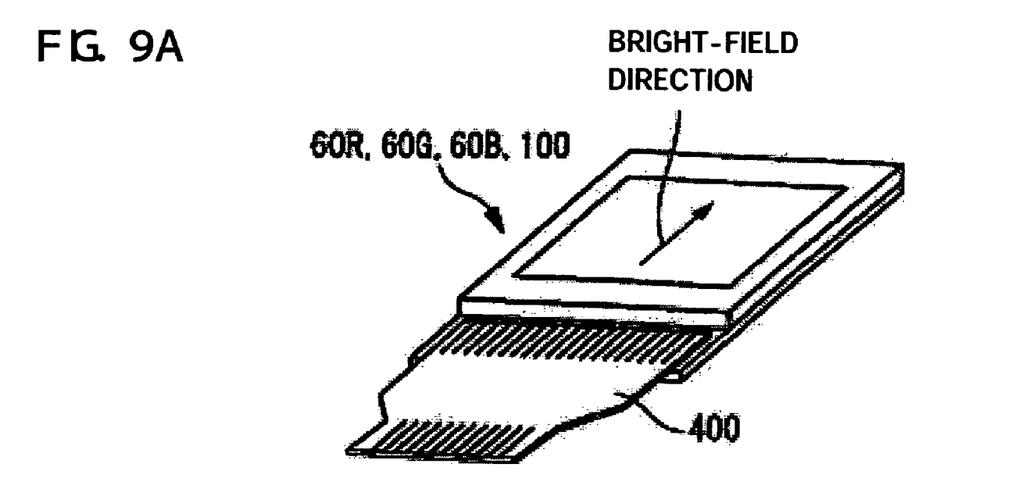
FIG. 9A is a view showing the bright-field direction of a liquid crystal light valve having a flexible substrate of FIG. 1.
Figure 9B:
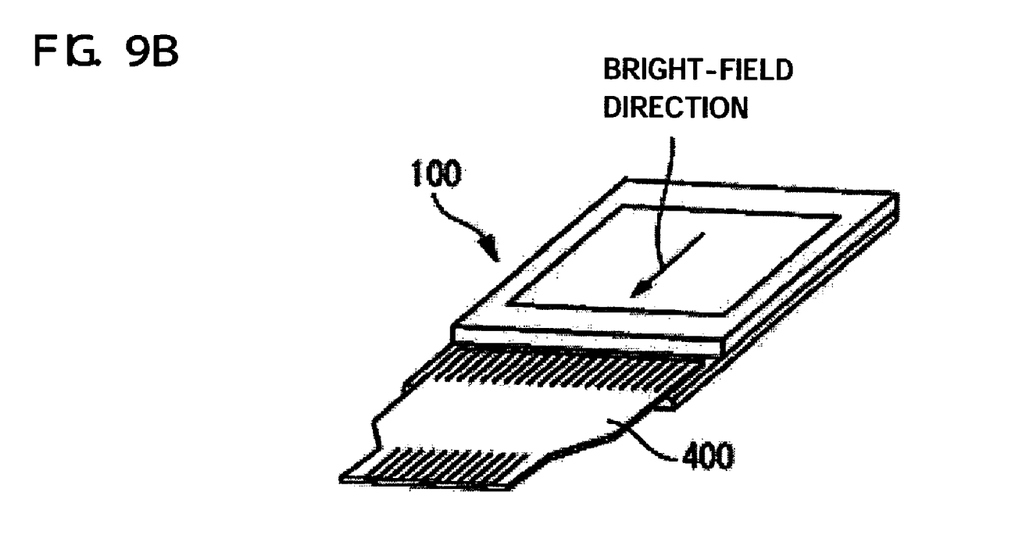
FIG. 9B is a view showing the bright-field direction of another liquid crystal light valve having the flexible substrate of FIG. 1.

Also, as is shown in FIG. 9A, one end of an FPC (Flexible Printed Circuit) 400 comprising a flexible substrate is connected to the end of each of the liquid crystal light valves 60B, 60G, 60R, and 100 in practice. The FPC 400 is a substrate having flexibility and comprising a film made of polyimide or the like. In a case where the liquid crystal light valve having the bright-field direction shown in FIG. 9A is used as the liquid crystal light valves 60B, 60G, and 60R and 100, so that the bright-field directions of the optical images of the liquid crystal light valves 60B, 60G, and 60R coincide with the bright-field direction of the liquid crystal light valve 100, the liquid crystal valve 100 is disposed in a state where it is rotated by 180° with respect to the liquid crystal light valves 60B, 60G, and 60R. However, it is preferable to use, as is shown in FIG. 9B, a liquid crystal light valve having the bright-field direction opposite to that shown in FIG. 9A as the liquid crystal light valve 100. In this case, because the need to rotate the liquid crystal light valve 100 by 180° with respect to the liquid crystal light valves 60B, 60G, and 60R is eliminated, the FPC's 400 face the same side. This makes it easer to dispose the liquid crystal light valves 60B, 60G, and 60R and the liquid crystal light valve 100.

The projector PJ1 is configured in such a manner that modulation takes place in order of the liquid crystal light valve 60B, 60G, and 60R, the relay lens 90, and the liquid crystal light valve 100 from the light source 10 side. However, the same advantage can be achieved when the PJ1 is configured in a contrary manner that modulation takes place in order of the liquid crystal light valve 100, the relay lens 90, the liquid crystal light valves 60B, 60G, and 60R from the light source 10 side.

The embodiment above described the three-plate projector as an example. However, the invention is also applicable to a single-plate projector. The single-type projector chiefly comprises a light source, a uniform illumination system, a first light modulation element, a relay lens system, a second light modulation element, and a projection lens. When a white light source is adopted as the light source, a color filter is provided to the liquid crystal light valve serving as the first light modulation element or the second light modulation element.

While the invention has been described using a projection type image display device as an example, the invention is also applicable to a direct-view image display device. The direct-view display device allows the viewer to view directly an image light modulated on the second light modulation element. The direct-view display device is advantageous in that it is suitable for viewing in a bright place.

The projector PJ1 is configured in such a manner that a light that has been modulated in color in the color modulation light valves is modulated in luminance in the luminance modulation light valve. However, the invention is not limited to this configuration, and it is possible to configure in such a manner that a light that has been modulated in luminance in the luminance modulation light valve is modulated in color in the color modulation light valves. Also, the projector PJ1 is configured in such a manner that the luminance of a light is modulated in two steps using the luminance modulation light valve and the color modulation light valves. However, the invention is not limited to this configuration, and it is possible to configure in such a manner that luminance of a light is modulated in two steps using two sets of luminance modulation light valves.

In the embodiment above, the light source comprising a single unit that emits a white light is used as the light source 10, and the white light is separated into lights of three primary colors, RGB. However, the invention is not limited to this configuration. It is possible to configure in such a manner that the portion to separate a white light is omitted, and instead, three light sources corresponding to the respective three primary colors, RGB, that is, a light source that emits an R light, a light source that emits a B light, and a light source that emits a B light, are provided.

In the embodiment above, active-matrix liquid crystal display elements are used as the liquid crystal light valves 60B, 60G, 60R, and 100. However, the invention is not limited to this configuration, and passive-matrix liquid crystal display elements and segment liquid crystal display elements can be used as the liquid crystal light valves 60B, 60G, 60R, and 100. The active-matrix liquid crystal display element is advantageous in that accurate gradation display is enabled. The passive-matrix liquid crystal display element and the segment liquid crystal display element are advantageous in that they can be manufactured at a low cost.

The entire disclosure of Japanese Patent Application No. 2005-066090, filed Mar. 9, 2005 is expressly incorporated by reference herein.

What is claimed is:

1. An image display device that displays an image by modulating a light from a light source according to display image data, the image display device comprising:
   a first light modulation element that modulates a light emitted from the light source; and
   a second light modulation element that is disposed on an optical path in series with the first light modulation element and modulates a light exiting from the first light modulation element,
   wherein the first light modulation element and the second light modulation element are disposed in such a manner that a bright-field direction of an optical image of the first light modulation element and a bright-field direction of the second light modulation element almost coincide with each other.

2. The image display device according to claim 1, further comprising:
an image forming system that forms the optical image of the first light modulation element on a light-receiving surface of the second light modulation element.

3. The image display device according to claim 2, wherein:
the image forming system is an inverted image forming portion; and
the bright-field direction of the optical image of the first light modulation element and the bright-field direction of the second light modulation element almost coincide with each other, and the first light modulation element and the second light modulation element are disposed to be rotational symmetric by 180° about an optical axis.

4. The image display device according to claim 1, wherein:
an opening in a unit pixel of the first light modulation element and an opening in a unit pixel of the second light modulation element are of substantially an identical shape.

5. The image display device according to claim 1, wherein:
the first light modulation element comprises plural light modulation elements each modulating a different color light;
the image display device further comprises a dichroic prism that combines lights modulated in the plural light modulation elements; and
the bright-field direction of the second light modulation element is adjusted in reference to a bright-field direction of a light modulation element from which a light that passes through the dichroic prism exits.

6. A projector, comprising:
an image display device that displays an image by modulating a light from a light source according to display image data and includes a first light modulation element that modulates a light emitted from the light source, and a second light modulation element that is disposed on an optical path in series with the first light modulation element and modulates a light exiting from the first light modulation element, the first light modulation element and the second light modulation element being disposed in such a manner that a bright-field direction of an optical image of the first light modulation element and a bright-field direction of the second light modulation element almost coincide with each other; and
a projection system that projects a light exiting from image display device.

7. The image display device according to claim 6, further comprising:
an image forming system that forms the optical image of the first light modulation element on a light-receiving surface of the second light modulation element.

8. The image display device according to claim 7, wherein:
the image forming system is an inverted image forming portion; and
the bright-field direction of the optical image of the first light modulation element and the bright-field direction of the second light modulation element almost coincide with each other, and the first light modulation element and the second light modulation element are disposed to be rotational symmetric by 180° about an optical axis.

9. The image display device according to claim 6, wherein:
an opening in a unit pixel of the first light modulation element and an opening in a unit pixel of the second light modulation element are of substantially an identical shape.

10. The image display device according to claim 6, wherein:
the first light modulation element comprises plural light modulation elements each modulating a different color light;
the image display device further comprises a dichroic prism that combines lights modulated in the plural light modulation elements; and
the bright-field direction of the second light modulation element is adjusted in reference to a bright-field direction of a light modulation element from which a light that passes through the dichroic prism exits.

* * * * *